US005777243A

United States Patent [19]
Kewish

[11] Patent Number: 5,777,243
[45] Date of Patent: Jul. 7, 1998

[54] ADJUSTABLE VEHICLE SIMULATOR RIG FOR CHASSIS DYNAMOMETER TESTING

[75] Inventor: Richard Dean Kewish, Novi, Mich.

[73] Assignee: Ford Global Technologies, Inc., Dearborn, Mich.

[21] Appl. No.: 829,386

[22] Filed: Mar. 31, 1997

[51] Int. Cl.⁶ .................................................. G01M 15/00
[52] U.S. Cl. .......................... 73/865.6; 73/117.1; 180/209; 180/906; 280/149.2
[58] Field of Search ................................ 73/117.1, 121, 73/128, 129, 669, 865.6; 180/209, 906; 280/149.2, 788

[56] References Cited

U.S. PATENT DOCUMENTS

| 3,306,601 | 2/1967 | Mitchell. | |
|---|---|---|---|
| 3,555,893 | 1/1971 | Holzman | 73/669 |
| 3,675,914 | 7/1972 | Douglass. | |
| 3,850,419 | 11/1974 | Craig. | |
| 4,263,809 | 4/1981 | Petersen et al. | 73/669 |
| 4,356,724 | 11/1982 | Ayoub et al.. | |
| 4,455,866 | 6/1984 | Barrigar | 73/117 |
| 4,491,305 | 1/1985 | Walters. | |
| 4,635,742 | 1/1987 | Bertolini | 180/209 |
| 4,869,539 | 9/1989 | Cassese | 280/788 |
| 5,139,233 | 8/1992 | Goss. | |
| 5,335,932 | 8/1994 | Pierce | 280/788 |
| 5,462,301 | 10/1995 | Schueman | 180/209 |
| 5,489,113 | 2/1996 | Torborg | 180/209 |
| 5,489,114 | 2/1996 | Ward et al. | 180/209 |
| 5,560,444 | 10/1996 | Tiedge | 180/209 |

FOREIGN PATENT DOCUMENTS

| 605814 | 11/1934 | Germany. |
|---|---|---|
| 2-161333 | 6/1990 | Japan. |

*Primary Examiner*—Ronald L. Biegel
*Assistant Examiner*—Eric S. McCall
*Attorney, Agent, or Firm*—Donald A. Wilkinson

[57] ABSTRACT

A vehicle simulator (20) for use in vehicle dynamometer and other types of testing for automotive vehicles. The simulator (20) is made up of a first portion and a second portion detachably connected to the first portion. The first portion preferably is formed from a front module (22) which is adjustable to accommodate various test engines (134) and test front suspensions (152) to accurately simulate a particular specified vehicle design. The second portion is preferably made up of a center module (24) and a detachable rear module (26) which are both adjustable to accommodate various systems associated with the center and rear of particular vehicle designs being simulated. All three of the modules are adjustable for width, length and height to accurately reflect the wheel base, ride height and other important dimensions of the vehicle being simulated.

20 Claims, 10 Drawing Sheets

ADJUSTABLE VEHICLE SIMULATOR RIG FOR CHASSIS DYNAMOMETER TESTING

FIELD OF THE INVENTION

The present invention relates to automotive vehicle testing and more particularly to systems for dynamometer testing of automotive vehicles.

BACKGROUND OF THE INVENTION

Conventional development of a new or re-designed automotive vehicle typically requires many tests to be run during the development to assure that the end result, a production vehicle, meets its design requirements for customer satisfaction. Many of these tests, such as for example driving under cold or hot weather conditions, emissions testing, fuel economy, engine and transmission calibration, drivability, etc., require at least part of the testing to be done on a dynamometer test set-up in order to achieve accurate enough results without having to drive an actual vehicle on a test track.

Generally, then, a significant number of bucks (i.e., vehicle mock-ups), partial test vehicles are built; either built up from scratch or built by modifying a current production vehicle to simulate the new design. This is needed to accomplish accurate tests, where the fuel system, exhaust system, radiator, engine, driveline, air conditioning and other systems are arranged and oriented as close as possible to where they will be on the new vehicle. However, these bucks are very expensive and time consuming to build, adding significantly to the cost of developing new vehicles and the time needed to allow for testing once some of the design parameters for the new vehicle have been initially determined. Also, since the buck is not actually designed for the new vehicle, the arrangement of some components which must be accessed often during testing are difficult to get access to, again increasing the time needed for testing. Moreover, the bucks are generally discarded after the testing is complete since they are only configured to simulate the configuration for that particular new vehicle being developed.

The need then, arises to reduce or eliminate the conventional bucks needed for testing during development of an automotive vehicle in order to reduce the cost and time needed. Therefore, a simple and inexpensive yet reliable system is desired that can provide the testing conditions needed while minimizing the cost and time, and without sacrificing the accuracy and reliability of the testing.

SUMMARY OF THE INVENTION

In its embodiments, the present invention contemplates a vehicle simulator for testing a test vehicle drivetrain including at least one of an engine, transmission, exhaust system, fuel system, front suspension system, rear suspension systems and wheels. The vehicle simulator comprises a front module having four portions, a front portion, a right side portion, a left side portion and a rear portion, with at least one of the four portions including engine mounting means adapted for mounting the engine and the transmission. The right side portion and the left side portion each include suspension mounting means adapted for variably mounting the front suspension system. The right side portion and the left side portion each include fore/aft extension means for selectively varying the length of the front module, and the front portion and the rear portion each include side extension means for selectively varying the width of the front module.

The vehicle simulator also comprises a rear-center module removably connected to the front module and having a front section, a right side section, a left side section and a rear section. The right side section and the left side section each include second fore/aft extension means for selectively varying the length of the rear-center module, and the front section and the rear section each include second side extension means for selectively varying the width of the rear-center module.

Accordingly, an object of the present invention is to employ an adaptable vehicle simulator that can accurately reproduce the critical dimensional and operating aspects of various vehicle concepts as they are being developed without building an actual vehicle.

An advantage of the present invention is that the simulator is fully adjustable in wheelbase; track width; engine, transmission and radiator location; exhaust system and fuel system configurations. This allows for re-use of a particular simulator many times for varied sizes and configurations of powertrains and vehicles.

A further advantage of the present invention is that substantial cost savings are achieved over conventional methods of building and testing unique individual test vehicles.

An additional advantage of the present invention is that individual modules of the vehicle simulator can be employed for various tests when an entire vehicle does not need to be simulated for the particular types of tests.

DETAILED DESCRIPTION OF THE PREFERRED EMBODIMENTS

FIGS. 1–10 illustrate an embodiment of the present invention wherein a vehicle simulator 20 is comprised of three modules, a front module 22, a center module 24 and a rear module 26. The three modules 22, 24, 26 are detachable from one another and can be used separately when the full simulator 20 is not needed for a particular test. The vehicle simulator 20 illustrated in FIGS. 1–8 is configured for a front wheel drive vehicle, but rear wheel drive vehicle configurations are also possible; these will be discussed in relation to FIGS. 11 and 12.

The rear module illustrated in FIGS. 1–10 is configured for a front wheel drive vehicle. The rear module 26 includes a pair of rear frame rails 28, each made up of a front portion 30 and a rear portion 32. Slotted holes 34 in the rear portions 32 mate with connector plates 35 mounted inside the portions 30, 32, allowing the two portions 30, 32 to be telescopically slid relative to one another before bolts 36 are tightened down to fix the overall length of the rear frame rails 28.

The rear module 26 also includes a rear cross member 38, made up of a pair of outer portions 40, and a middle portion 42 which telescopically slides around the outer portions 40. Slotted holes 44 in the middle portion 42 allow for adjustments in length of the rear cross member 38 before bolts 46 are tightened to fix beam to the desired length. The two outer portions 40 include end plates 47 which are bolted to the rear ends of the rear frame rails 28 in order to form the rear end of the vehicle simulator 20.

Three slidable cross members 48 include U-shaped clips 50 at each end and are mounted on and slidable along upper lips 52 on the frame rails 28. These three cross members 48 allow for support brackets to be hung from them to simulate attach points for members of the vehicle system being tested. For example, fuel tank supports 54 are hung from the front one of the cross members 48 to support the rear end of the particular test fuel tank 56 illustrated. Further, other minor support members 55 can be hung from the cross members 48, as needed, in order to assure proper simulation of support for items such as exhaust tail pipes 57.

The rear frame rails 28 also include lower lips 58, which also allow support brackets to be hung from them. For example, exhaust support brackets 60 are shown supporting the particular test mufflers 62 illustrated.

The rear frame rails 28 also each include four horizontal slots, a pair of upper slots 64 and a pair of lower slots 66, vertically aligned with the upper slots 64. These slots 64, 66 allow for wheel support plates 68 to be mounted with bolts 70 to the desired fore/aft location to simulate the proper rear wheel location for the design specifications of the vehicle being simulated. The wheel support plates 68 each include a set of four vertical slots 72, to which one of a pair of test wheels 74 is bolted. The vertical slots 72 allow the rear ride height to be adjusted by moving the wheels 74 up or down before tightening the bolts.

Figure 3:
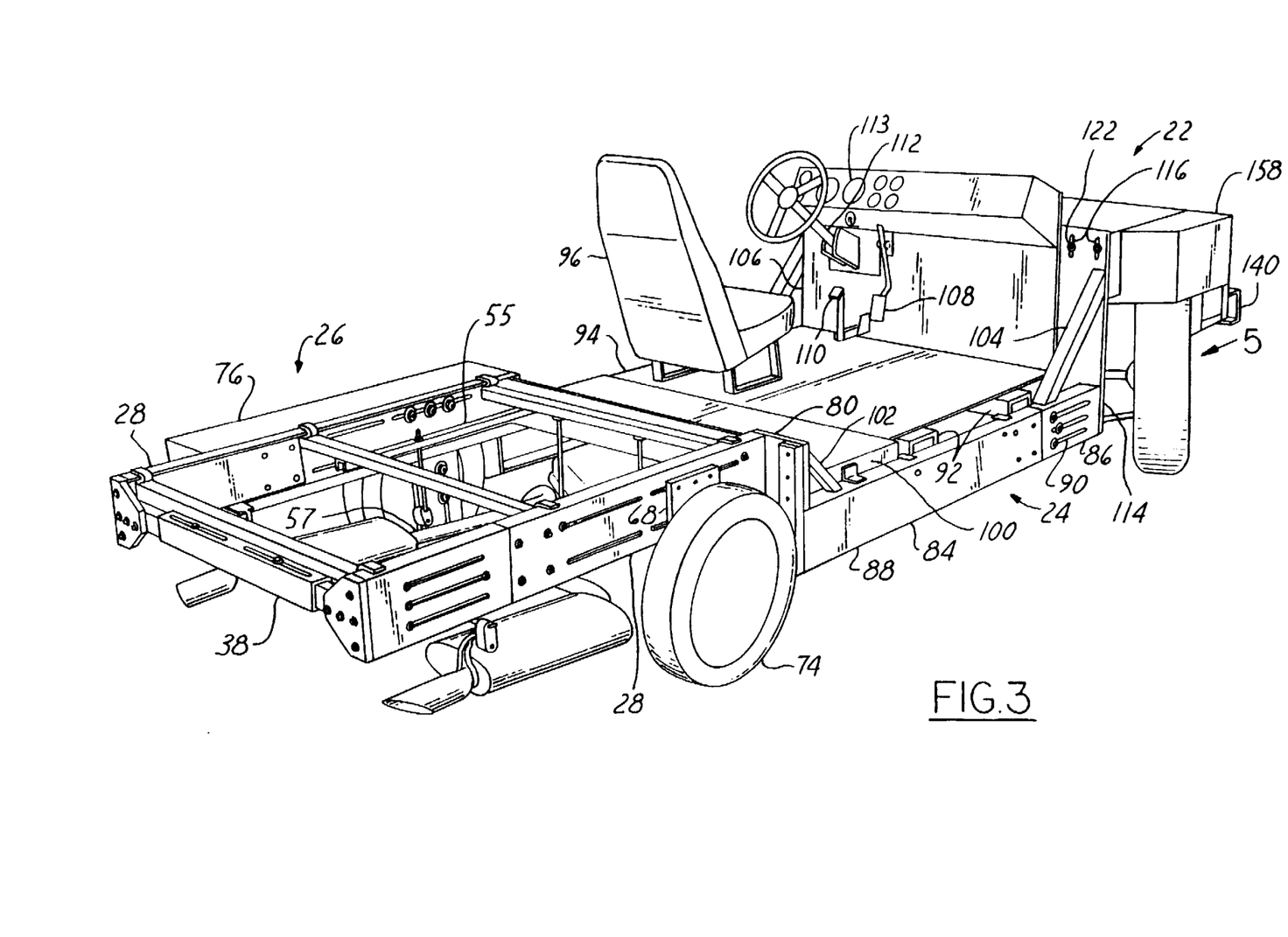
FIG. 3 is perspective view, looking forward, of the adjustable vehicle simulator rig with the cab shown removed, in accordance with the present invention.
Figure 4:
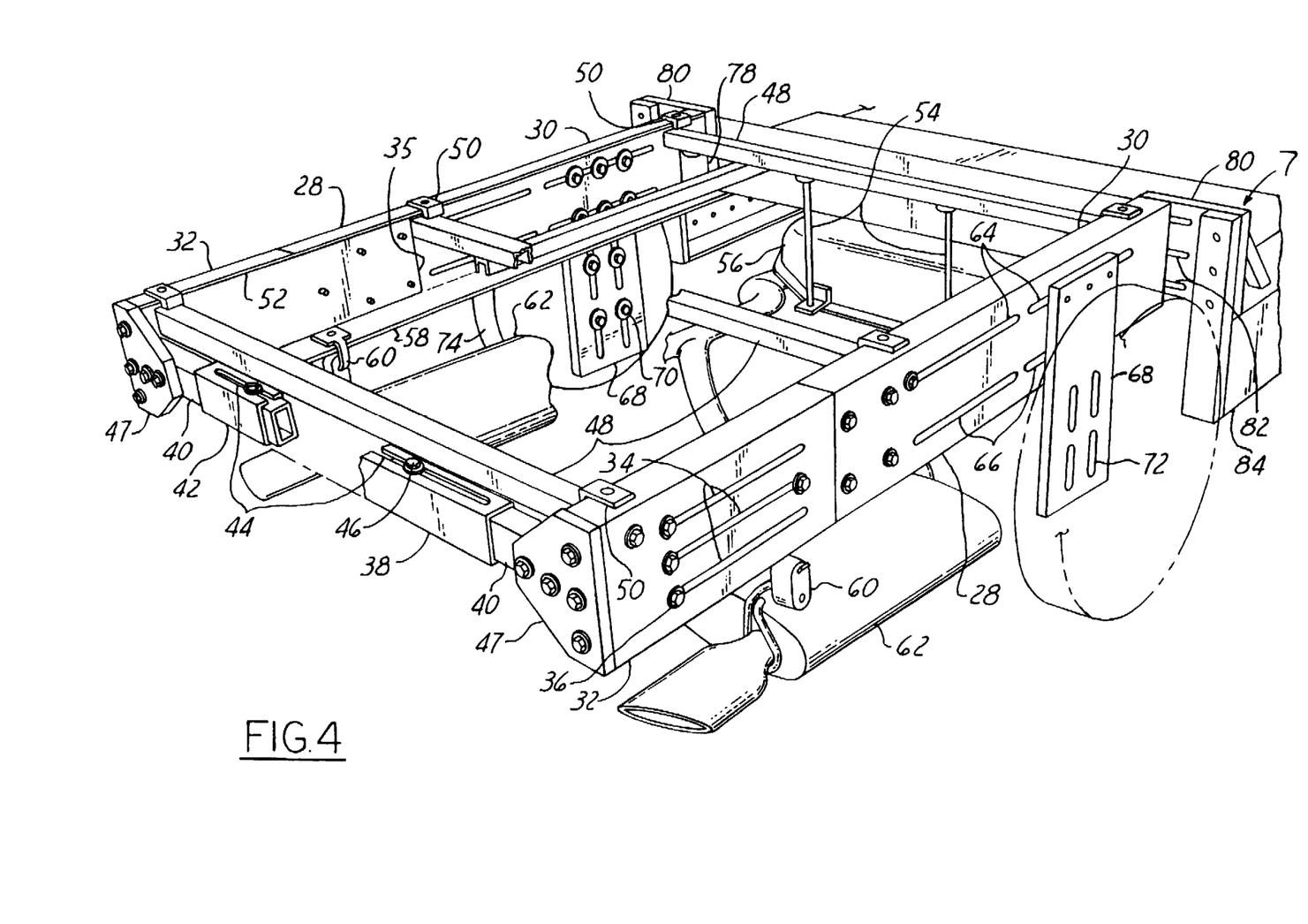
FIG. 4 is a partial perspective view, similar to FIG. 3, on an enlarged scale.
Figure 5:
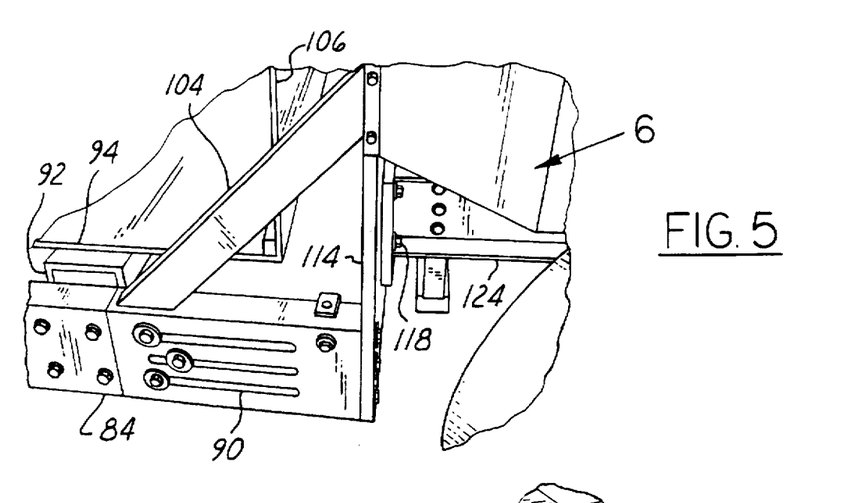
FIG. 5 is a view taken in the direction of arrow 5 in FIG. 3.
Figures 6, 7:
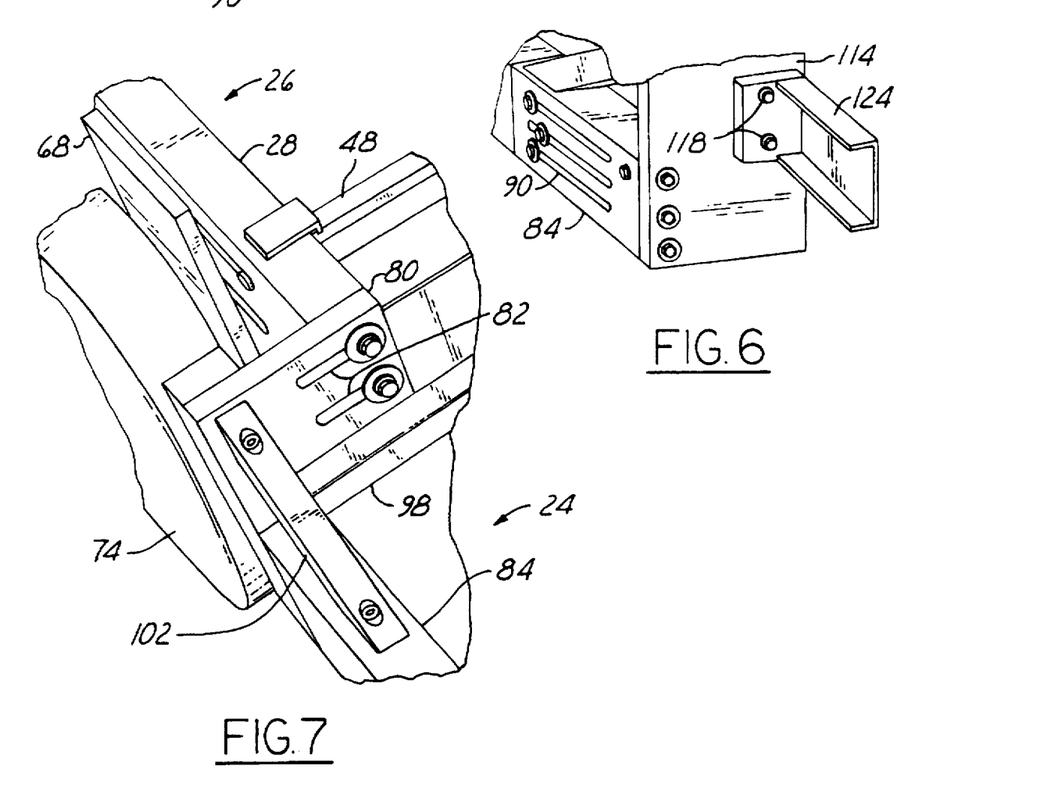
FIG. 6 is a view taken in the direction of arrow 6 in FIG. 5.
FIG. 7 is a view taken in the direction of arrow 7 in FIG. 4.
Figure 8:
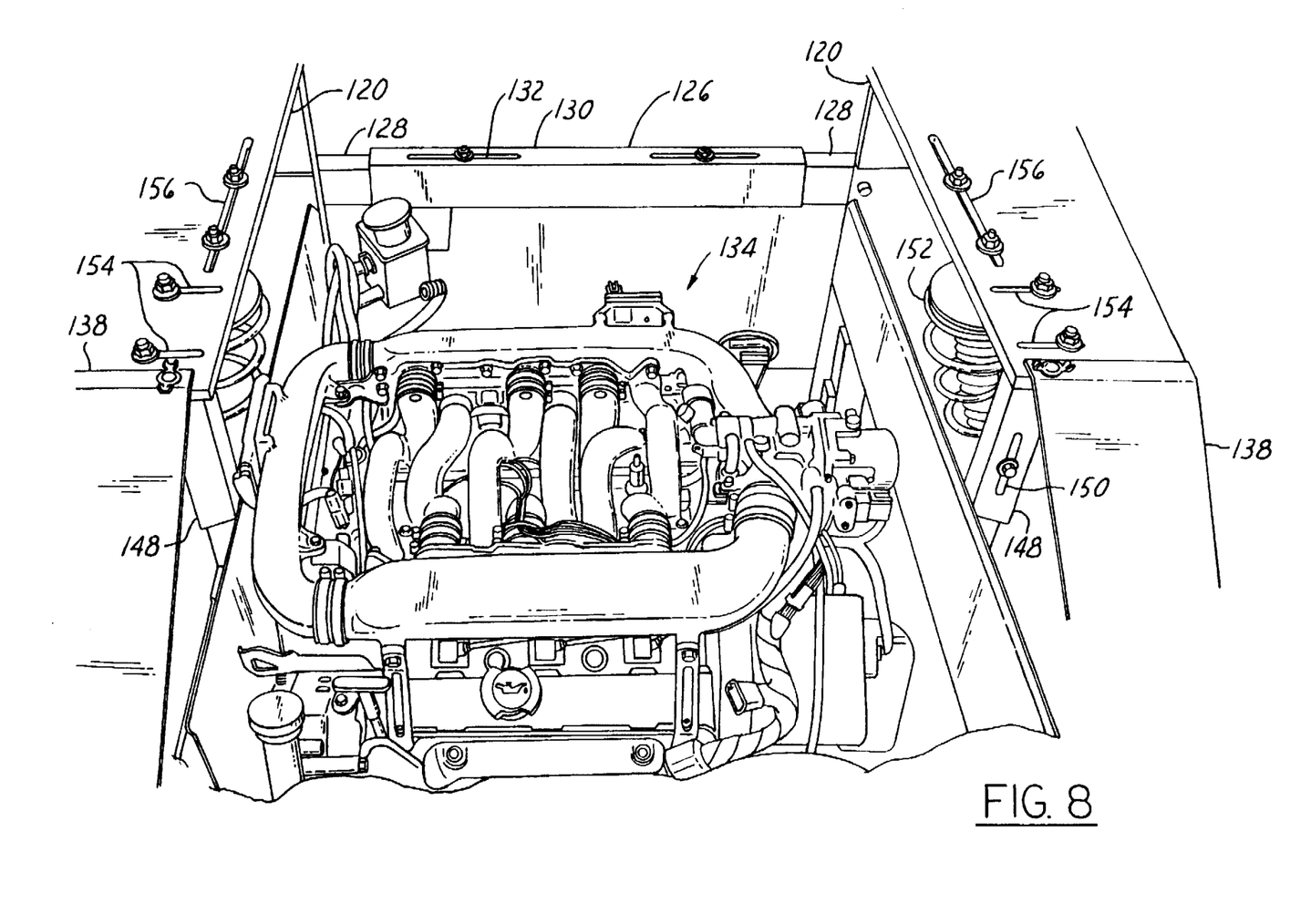
FIG. 8 is a view looking rearward into an engine bay of the vehicle simulator in accordance with the present invention.
Figure 9:
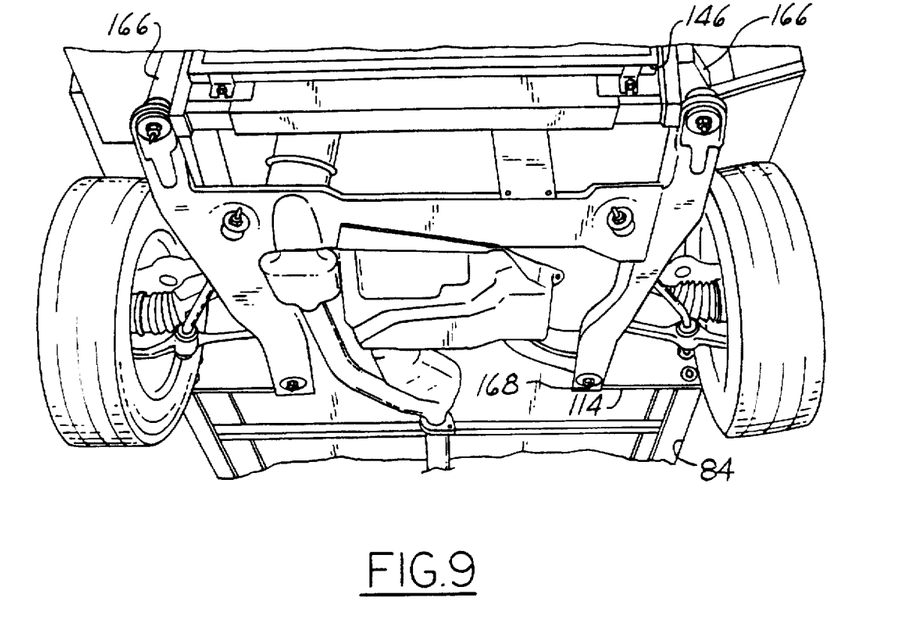
FIG. 9 is a partial, perspective view of the underside of the vehicle simulator looking up and aft, in accordance with the present invention.
Figure 10:
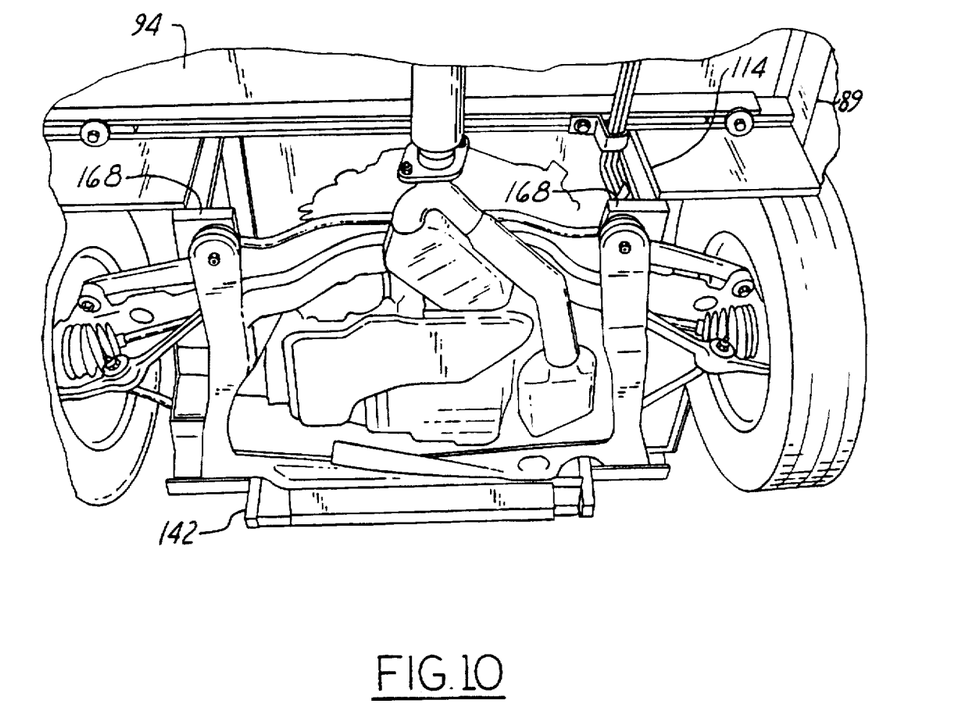
FIG. 10 is a partial, perspective view of the underside of the vehicle simulator looking up and forward, in accordance with the present invention.
Figure 11:
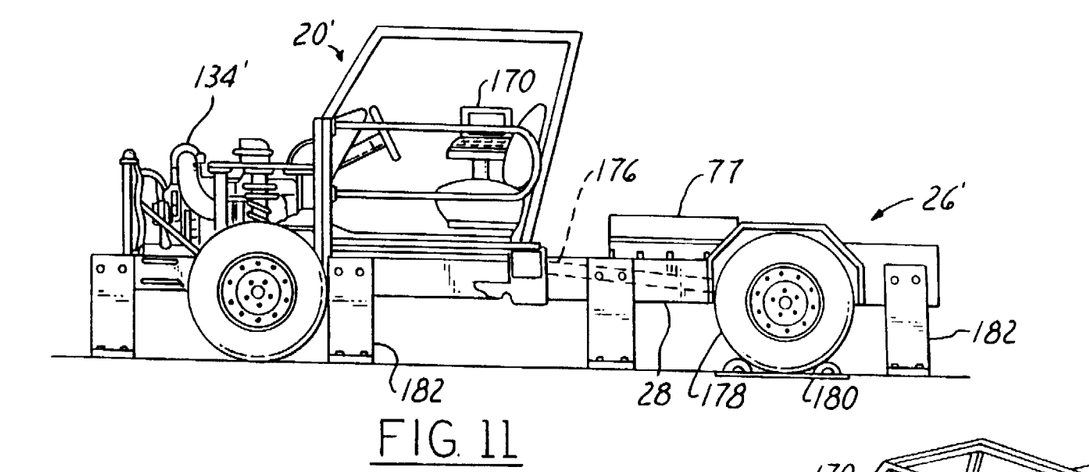
FIG. 11 is a side view of a second embodiment of the vehicle simulator, configured for testing a rear wheel drive vehicle.
Figure 12:
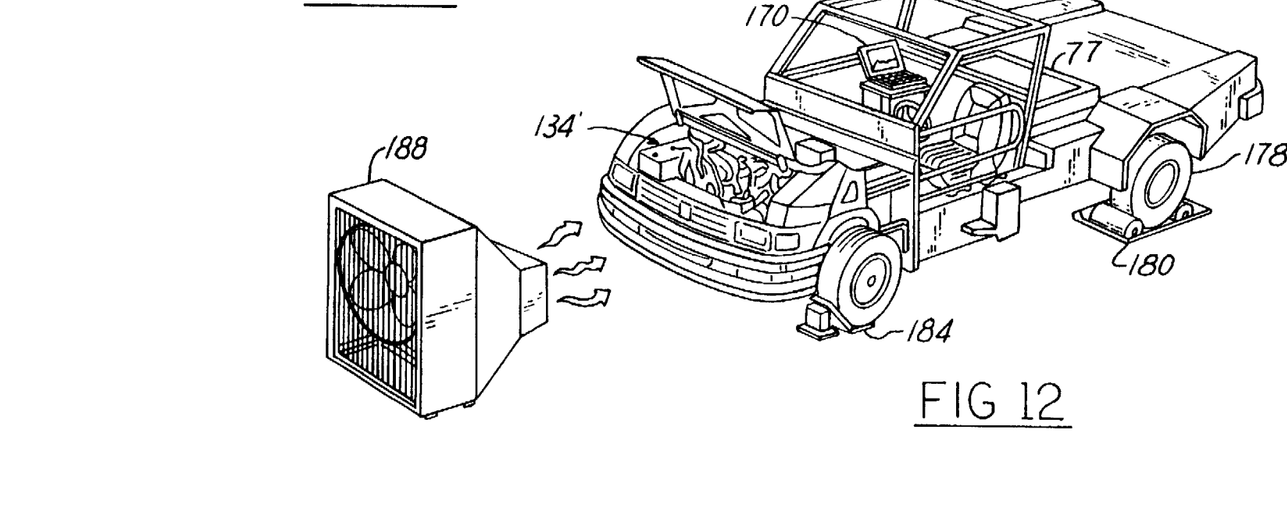
FIG. 12 is a perspective view of the second embodiment of the vehicle simulator, similar to FIG. 11.

Also mounted to the rear frame rails 28 are two wheel covers 76, one of which is illustrated in FIG. 3. A rear weight box 77, as illustrated in FIGS. 11 and 12, is mounted on the rear module 26. The amount of weight added to the box 77 depends upon the vehicle being tested, and is added to the extent necessary to simulate the proper rear axle weight that would be present for the particular vehicle design being tested. The front end of each of the rear frame rails 28 includes an end plate 78 configured to align with a corresponding one of a pair of rear attachment plates 80 on the center module 24. The rear attachment plates 80 include slotted holes 82 in order to allow the width of the rear module 26 to vary to account for wheel spacing requirements, without having to adjust the width of the center module 24.

The center module 24 includes a pair of center frame rails 84, which are affixed to the rear attach plates 80. The center frame rails 84 are each made up of a front portion 86, a rear portion 88, and a connector plate with horizontal slotted holes 90 in the front portion 86. This allows the two portions to slide relative to one another in order to increase/decrease the length of the center module 24 to simulate the desired wheel base. A pair of center module floor supports 92 are attached between the frame rails 84 to support a floor plate 94. The floor plate, then, supports a seat 96 for a technician to sit in during testing and provides a place for the technician to stand. A fuel tank cover support 98 is mounted between the frame rails 84, and a fuel tank cover 100 is mounted on top of it. The cover 100 is removable, and is sized to generally cover the complete test fuel tank 56. It is also insulated for heat protection. The test tank 56 can then also be heated for fuel tank purge calibration.

Figure 1:
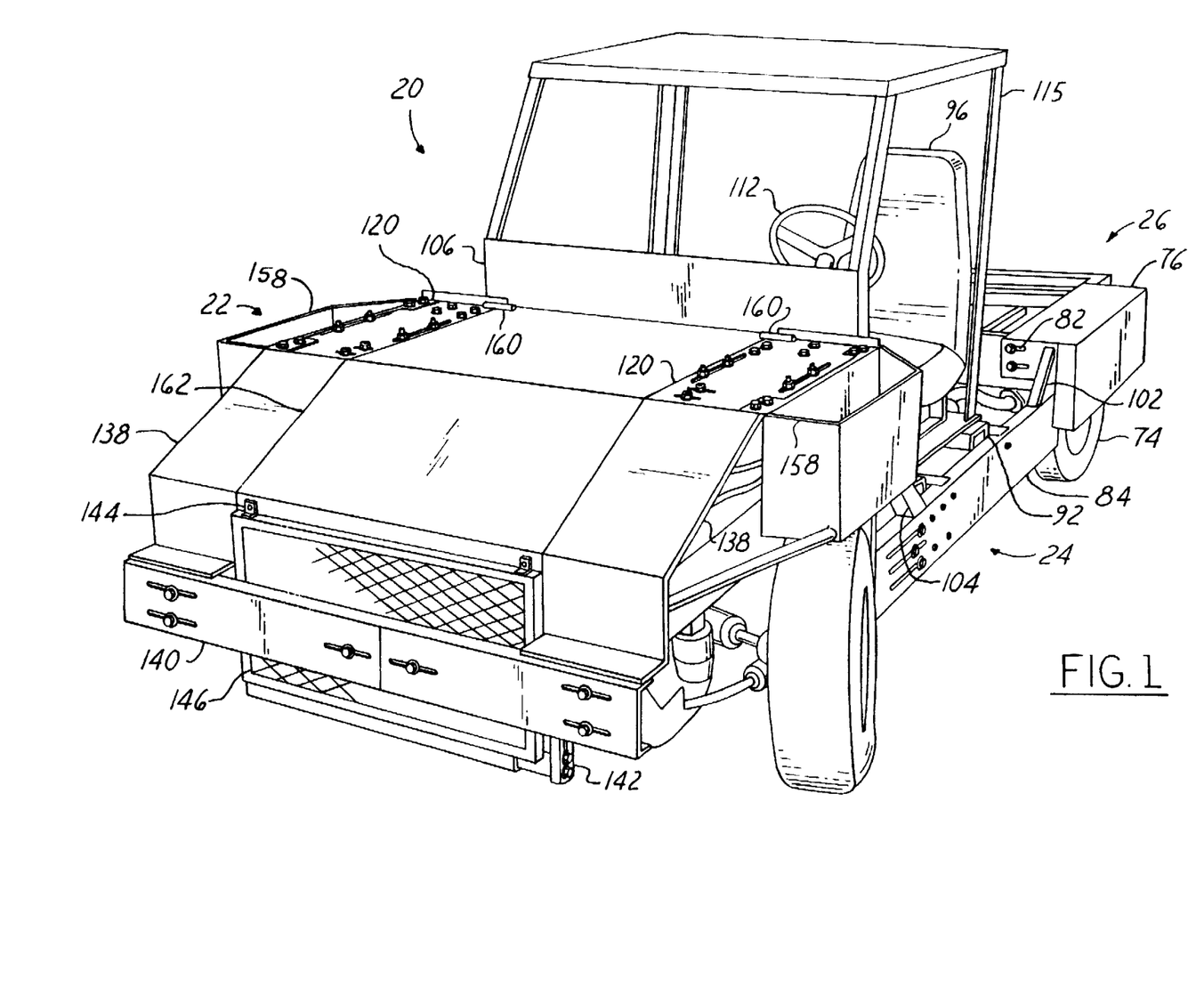
FIG. 1 is a perspective view, looking rearward, of an adjustable vehicle simulator rig in accordance with the present invention.
Figure 2:
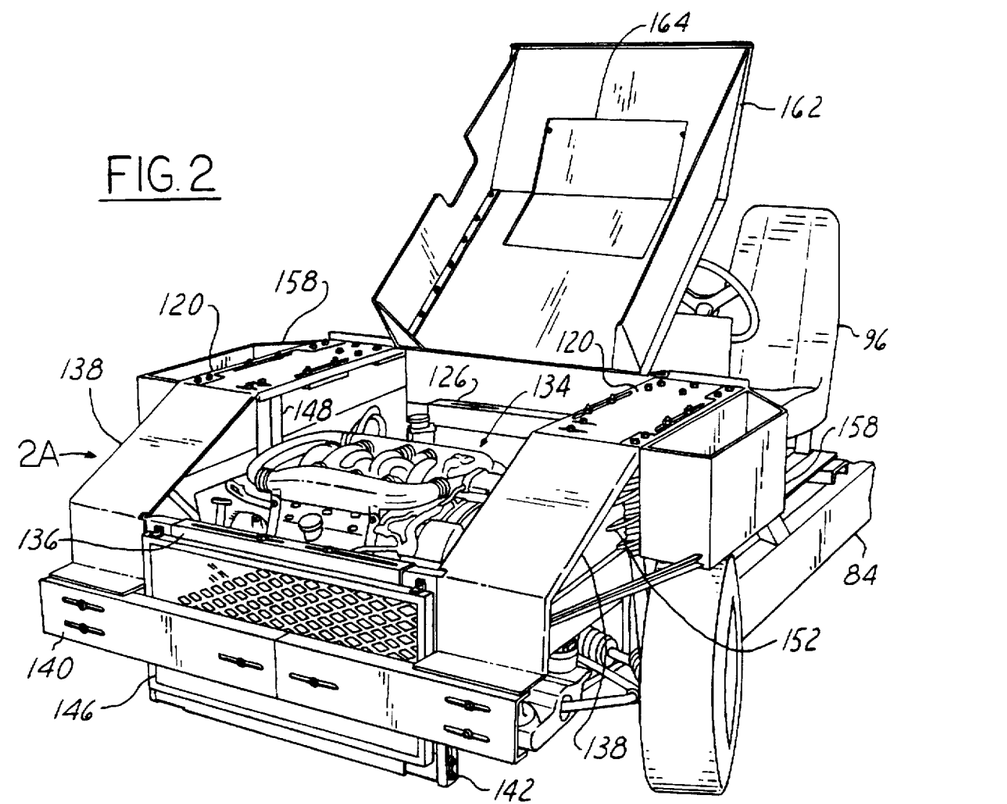
FIG. 2 is partial, perspective view similar to FIG. 1 with the hood up and the cab shown removed.
Figure 2A:
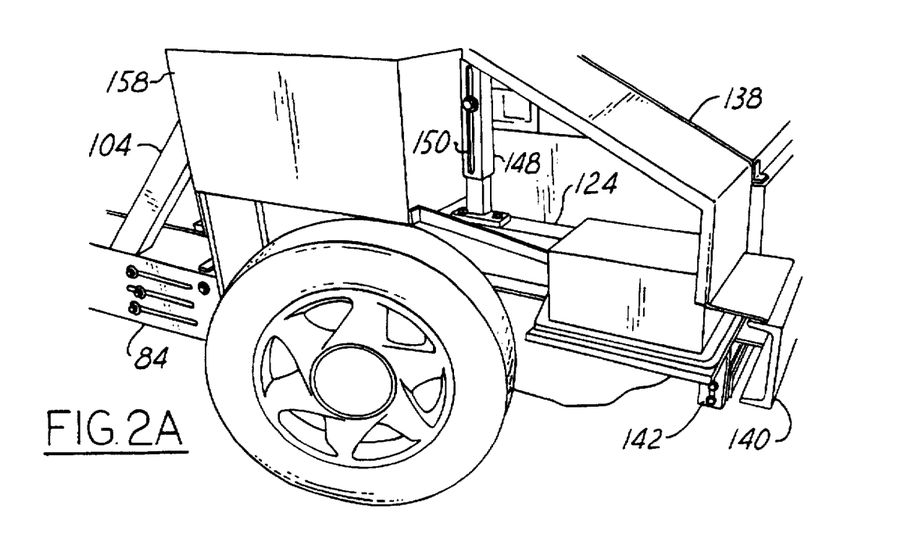
FIG. 2A is a view taken in the direction of arrow 2A in FIG. 2.

Rear angled braces 102 and front angled braces 104 mount to the frame rails 84 of the center module 24 and also to the rear module 26 and front module 22 to provide rigidity to the structure. The center module 24 also includes a vertical support plate 106, which is mounted on the front edge of the floor plate 94. The vertical plate 106 provides support for mounting an accelerator pedal 108, brake pedal 110, a steering column 112 and an instrument panel with gauges 113, all of which can be employed by the technician during testing. Also, for convenience of the technician, a cab 115 can be mounted on the center module 24, as is illustrated in FIG. 1.

Front attach plates 114 are mounted to the front ends of the center frame rails 84. The front attach plates 114 each include vertically slotted holes 116, with each secured to the vertical portion of respective upper suspension mounting plates 120 via bolts 122, and another set of holes which secure front frame rails 124 to the attach plates 114 via bolts 118.

A rear cross member beam 126 extends between the pair of front attach plates 114. The rear cross member beam 126 is made up of three parts, two outer portions 128, and a center portion 130 within which the outer portions 128 telescope. The center portion 130 has slotted holes 132, allowing for the width of the beam 126 to adjust as the width of the engine bay is adjusted to match the design specification of the particular test engine 134. A front cross car beam 136 is configured similar to the rear cross car beam 126 and extends between a pair of front fender members 138.

The front fender members 138 are mounted at their rear ends to the horizontal portion of the upper suspension mounting plates 120, and at their front ends to a bumper type cross car beam 140. The bumper type cross car beam 140 is formed in multiple pieces to allow for variations in the width of the front module 22 required to meet design specifications for the particular test engine 134. The bumper beam 140 is mounted to the front end of the front frame rails 124.

Extending down and back from the bumper beam 140 is a pair of lower radiator mounting brackets 142, and extending from the front cross car beam 136 is a pair or upper radiator mounting brackets 144. The four brackets 142, 144 include slotted holes to allow for various sizes and shapes of test radiators 146, for mounting in the specified relationship to the test engine 134.

Vertical support beams 148 mount between the forward portion of the upper suspension mounting plates 120 and the front frame rails 124. The beams 148 are formed from two pieces, with slotted holes 150 to allow for the proper spacing between the plates 120 and the front frame rails 124 for the particular test engine 134 and test front suspension 152. Also, the holes 154 in the mounting plates 120 are slotted to allow for inboard/outboard adjustments in the attachment location of the vertical support beams 148.

The upper suspension mounting plates 120 also include slotted holes 156 to allow for proper mounting of the upper end of the particular test front suspension 152. Adjustments in these slotted holes along with the front attach plates 114 will allow the proper front ride height to be simulated. Front end alignment can be set to production specifications and is adjustable six degrees caster or camber. Toe-in is adjustable in the conventional manner (tie rods on the test suspension).

Two front weight boxes 158 are mount to the horizontal portion of the upper suspension mounting plates 120. The appropriate amount of weight can then be added to simulate the front axle load for a particular vehicle design being tested, which allows rolling resistance to be the same as with a production vehicle.

Hinges 160 are mounted to the front attach plates 114, to which a hood 162 is mounted. The hood 162 opens for easy access to the test engine 134. Insulation 164 is preferably mounted on the inside of the hood 162. The insulation 164 can be changed to simulate the proper amount of heat that would be trapped in the engine bay by the production vehicle hood, to more accurately reflect the engine operating temperatures.

As for the test engine 134, it mounts to forward flanges 166 and rear flanges 168 on the front frame rails 124. Again, the length of the front frame rails 124 and the mounting locations of the engine mounting flanges 166, 168 can change to accommodate the particular test engine 134 being mounted.

Thus, the vehicle simulator 20 allows a build to vehicle dimensions, such as radiator to block, condenser to radiator, fuel tank to ground, etc. Most of the components, then, are installed in production locations, which allows the use of prototype and production vehicle parts, (fuel lines, fuel tank, complete exhaust system, carbon canisters and lines, etc.) minimizing costs associated with fabricating one of a kind parts for testing. Further, the systems are functional on this simulator, allowing actual testing of the various systems. A computer 170 to monitor and/or control the vehicle simulator can either be mounted on the vehicle simulator 20 (as is illustrated in FIGS. 11 and 12) or apart from it, depending upon the preferences of the technician conducting the tests and the particular tests being conducted.

A second embodiment is illustrated in FIGS. 11 and 12 where the vehicle simulator 20' is configured for a rear wheel drive vehicle. In this embodiment, elements which are changed relative to corresponding elements in the first embodiment will be referenced with the same element number, but with an added prime. A test drive shaft 176 now extends between the test engine 134' and a test rear axle, differential, suspension and wheel assembly 178, which is mounted on standard rollers 180 for a dynamometer. The assembly 178 now mounts to the rear frame rails 28, rather than having wheel support plates and dummy test wheels as in the first embodiment.

Also, while FIG. 11 illustrates L-brackets 182 mounted between the simulator 20' and the floor of a test room, for holding the vehicle in place during testing, wheel ramps 184 can also be employed as illustrated in FIG. 12. FIG. 12 also illustrates a front module 22' where a simulated grill and front bumper assembly 186 is mounted to it to further improve the accuracy of the testing. In FIG. 12, a fan 188 is illustrated blowing air across the grill and bumper assembly 186 during testing to simulate air flow across a moving vehicle. This allows for more accurate results for certain tests, such as for emissions testing.

Figure 13:
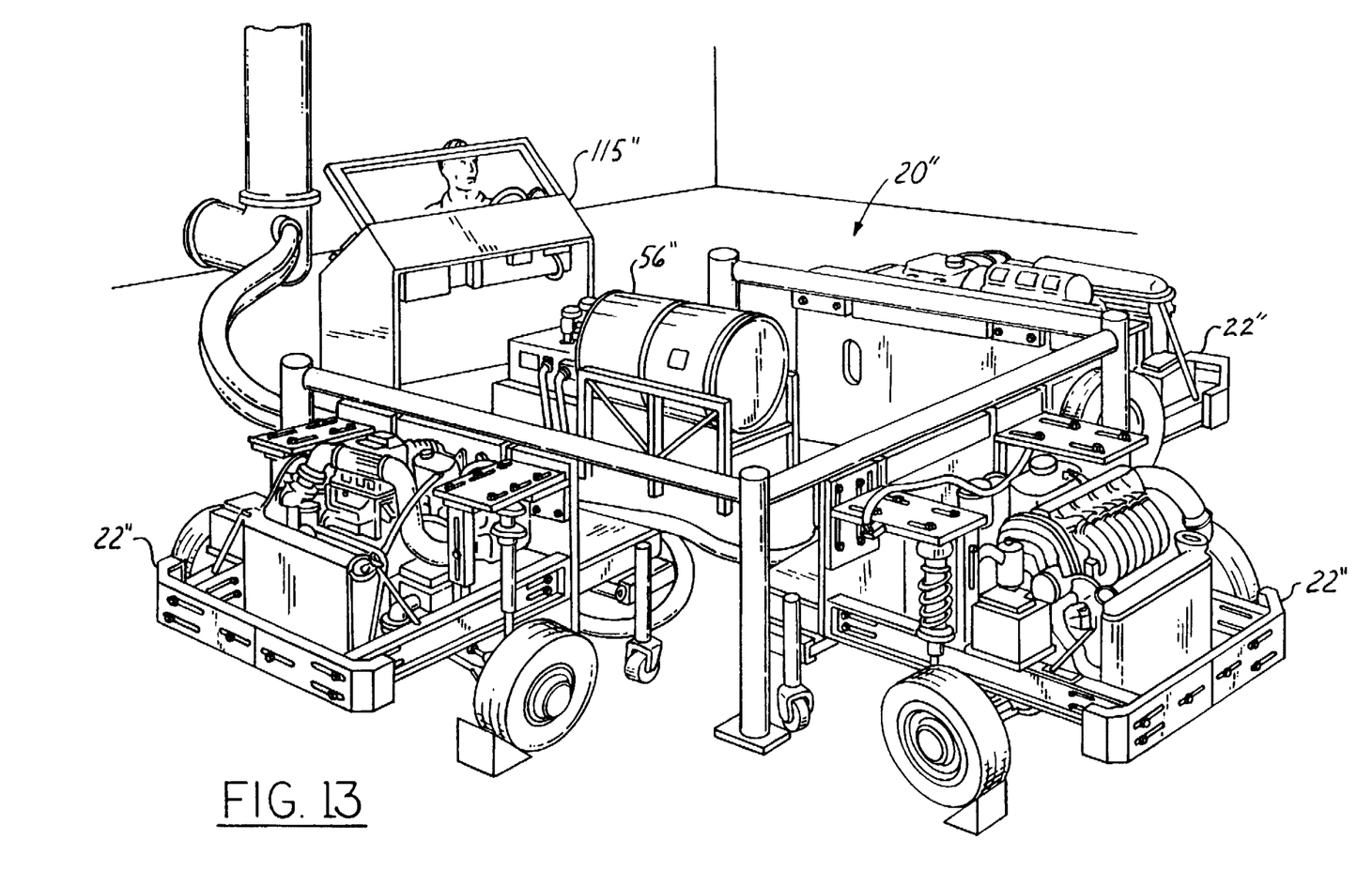
FIG. 13 is a third embodiment of the vehicle simulator illustrating three front modules of vehicle simulators in a test set-up in accordance with the present invention.

FIG. 13 shows a third embodiment, illustrating the flexibility of the vehicle simulator 20", where only portions of the front modules 22" from three simulators are employed to conduct environmental testing since the center and rear modules are not needed. Only one fuel tank 56" is needed for all three modules 22", and the cab 115" for the technician is now a test stand which can control all three at once. In this embodiment, elements which are changed from corresponding elements in the first embodiment will be referenced with the same element number, but with an added double prime. This arrangement saves space in the test facility for the particular test, while still being able to re-attach the center and rear modules for other types of testing at a later date, with minimal expense and time.

Figure 14:
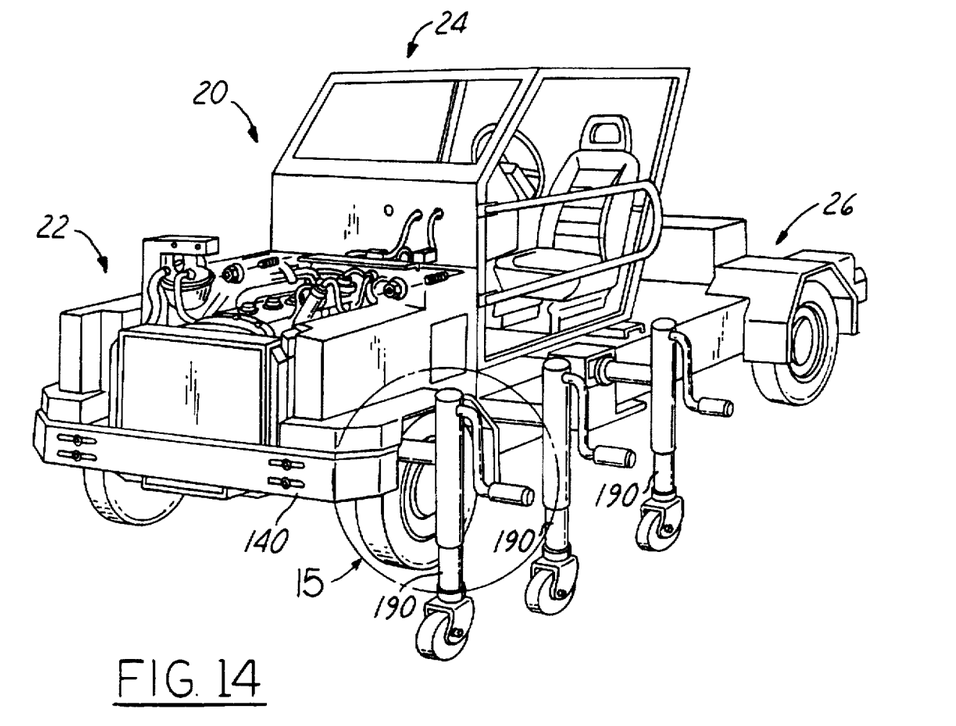
FIG. 14 is a perspective view of the vehicle simulator and engine change-out jacks, in accordance with the present invention.
Figure 15:
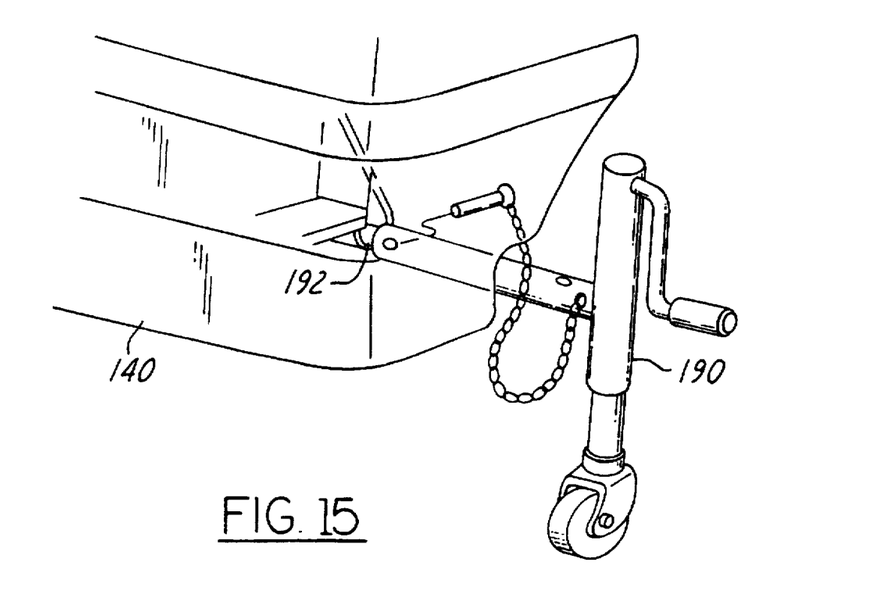
FIG. 15 is a perspective view, on an enlarged scale, taken from encircled area 15 in FIG. 14.

FIGS. 14 and 15 illustrate the vehicle simulator 20 when it is being readied to change components being tested. A set of portable jacks 190 mount to pins 192 extending from the frame rails. The jacks 190 are used to lift the modules as needed to connect or disconnect them and also to raise the simulator to allow access for a technician when changing the test engine 134 to a new one for other testing.

As a further alternate to the embodiments disclosed herein, one can also create the vehicle simulator with only a front module and a second module combining the center and rear modules into one module; although, some of the benefits associated with having three separate detachable modules will be lost.

While certain embodiments of the present invention have been described in detail, those familiar with the art to which this invention relates will recognize various alternative designs and embodiments for practicing the invention as defined by the following claims.

I claim:

1. A vehicle simulator for testing a test vehicle drivetrain including at least one of an engine, transmission, exhaust system, fuel system, front suspension system, rear suspension systems and wheels, the vehicle simulator comprising:

a front module having four portions, a front portion, a right side portion, a left side portion and a rear portion, with at least one of the four portions including engine mounting means adapted for mounting the engine and the transmission, and with the right side portion and the left side portion each including suspension mounting means adapted for variably mounting the front suspension system; the right side portion and the left side portion each including fore/aft extension means for selectively varying the length of the front module, and the front portion and the rear portion each including side extension means for selectively varying the width of the front module; and a rear-center module removably connected to the front module and having a front section, a right side section, a left side section and a rear section; with the right side section and the left side section each including second fore/aft extension means for selectively varying the length of the rear-center module, and the front section and the rear section each including second side extension means for selectively varying the width of the rear-center module.

2. The vehicle simulator of claim 1 wherein the rear-central module comprises:

a rear module;

a center module located between the front module and the rear module, and including a rear attach plate, with the center module removably connected to the front module and also removably connected to the rear module via the rear attach plate; and the right side section includes a right rear side section and a right center side section and the left side section includes a left rear side section and a left center side section.

3. The vehicle simulator of claim 2 wherein the right side section of the rear module and the left side section of the rear module each includes a rear frame rail that are removably mountable to the rear attach plate and selectively adjustable relative to it; and the right side section of the center module and the left side section of the center module each includes a center frame rail that are mounted to the rear attach plate.

4. The vehicle simulator of claim 3 wherein the right side portion and the left side portion of the front module each includes a front frame rail and a suspension mounting plate, and the front section of the rear center module includes a front attach plate, with the front frame rails and the suspension mounting plate mounted to and selectively adjustable relative to the front attach plate.

5. The vehicle simulator of claim 4 wherein each of the suspension mounting plates is adapted to mount a vehicle front suspension thereto.

6. The vehicle simulator of claim 5 wherein each of the rear frame rails includes a rear wheel support plate adjustably mounted thereto, with each of the rear wheel support plates adapted to adjustably mount a wheel thereto; and wherein the center module and the rear module each include means adapted for adjustably mounting a vehicle exhaust system.

7. The vehicle simulator of claim 6 further including a weight box mounted on the rear-center module.

8. The vehicle simulator of claim 3 wherein each of the rear frame rails include a means adapted for mounting a rear suspension assembly.

9. The vehicle simulator of claim 8 wherein the right side portion and the left side portion of the front module each includes a front frame rail and a suspension mounting plate, and the front section of the rear-center module includes a front attach plate, with the front frame rails and the suspension mounting plate mounted to and selectively adjustable relative to the front attach plate; and wherein each of the suspension mounting plates is adapted to mount a vehicle front suspension thereto.

10. The vehicle simulator of claim 1 wherein the front portion of the front module includes means adapted for adjustably mounting a vehicle radiator, and the front module further includes a weight box mounted thereto.

11. The vehicle simulator of claim 1 further including a hood which is pivotally mounted to the front module and adapted to cover the engine.

12. The vehicle simulator of claim 11 wherein the hood includes insulation mounted thereto adapted to cover a portion of the engine.

13. The vehicle simulator of claim 1 wherein the rear-center module further includes seating means adapted for supporting a technician, and control means adapted for allowing control of the engine by the technician.

14. The vehicle simulator of claim 1 wherein the rear-center module further includes means adapted for adjustably mounting a fuel tank.

15. The vehicle simulator of claim 14 further including insulation means adapted for covering a portion of the fuel tank.

16. A vehicle simulator for testing a test vehicle drivetrain including an engine, transmission, exhaust system, fuel system, front and rear suspension systems and wheels, the vehicle simulator comprising:

a front module having four portions, a front portion, a right side portion, a left side portion and a rear portion, with at least one of the four portions including engine mounting means adapted for mounting the engine and the transmission, and with the right side portion and the left side portion each including suspension mounting means adapted for variably mounting the front suspension system, the right side portion and the left side portion being selectively extendible to vary the length of the front module and the front portion and the rear portion being selectively extendible to vary the width of the front module;

a rear module having a first front section, a first right side section, a first left side section and a first rear section, with the first right side section and the first left side section each including second fore/aft extension means for selectively varying the length of the rear module and the first front section and the first rear section each including second side extension means for selectively varying the width of the rear module; and a center module located between the front module and the rear module, and removably connected between the front module and the rear module; with the central module including a second front section, a second right side section, a second left side section and a second rear section.

17. The vehicle simulator of claim 16 wherein the second right side section and the second left side section each include third fore/aft extension means for selectively varying the length of the center module and the second front section and the second rear section each include third side extension means for selectively varying the width of the center module.

18. The vehicle simulator of claim 16 wherein the front module further includes means adapted for adjustably mounting the radiator, and the center and rear modules include means adapted for adjustably mounting the exhaust system and means adapted for adjustably mounting the fuel system.

19. A vehicle simulator for testing a test vehicle drivetrain including an engine, transmission, exhaust system, fuel system, front and rear suspension systems and wheels, the vehicle simulator comprising:

a front module having four portions, a front portion, a right side portion, a left side portion and a rear portion, with at least one of the four portions including engine mounting means adapted for mounting the engine and the transmission, and with the right side portion and the left side portion each including suspension mounting means adapted for variably mounting the front suspension system, the right side portion and the left side portion being selectively extendible to vary the length of the front module and the front portion and the rear portion being selectively extendible to vary the width of the front module;

a rear module having a first front section, a first right side section, a first left side section and a first rear section, with the first right side section and the first left side section each including second fore/aft extension means for selectively varying the length of the rear module and the first front section and the first rear section each including second side extension means for selectively varying the width of the rear module; and a center module located between the front module and the rear module, and removably connected between the front module and the rear module; with the central module including a second front section, a second right side section, a second left side section and a second rear section; the center module further including a seat mounted thereon, and an accelerator pedal, a brake pedal and a steering assembly mounted thereon in proximity to the seat and adapted to allow for control of an engine.

20. The vehicle simulator of claim 19 wherein the rear module is adapted to adjustably mount the rear suspension system thereto.

* * * * *